United States Patent
Sasanapuri et al.

(10) Patent No.: US 9,949,177 B2
(45) Date of Patent: Apr. 17, 2018

(54) DETERMINING A TARGET CELL UNDER CELL IDENTIFIER CONFUSION DURING HANDOVERS AT A BASE STATION

(71) Applicant: QUALCOMM Incorporated, San Diego, CA (US)

(72) Inventors: Mohana Rao Sasanapuri, Hyderabad (IN); Pravin Raghavendra, Hyderabad (IN); Srinivas Vanjari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 14/617,778

(22) Filed: Feb. 9, 2015

(65) Prior Publication Data

US 2016/0234733 A1    Aug. 11, 2016

(51) Int. Cl.
*H04W 36/00*    (2009.01)

(52) U.S. Cl.
CPC ... *H04W 36/0061* (2013.01); *H04W 36/0083* (2013.01)

(58) Field of Classification Search
CPC ............ H04W 36/0061; H04W 36/0083
USPC .......................................... 455/436
See application file for complete search history.

(56) References Cited

U.S. PATENT DOCUMENTS

| 8,452,320 | B2 | 5/2013 | Gresset et al. |
| 2010/0240358 | A1 | 9/2010 | Jen et al. |
| 2012/0329461 | A1 | 12/2012 | Teyeb et al. |
| 2013/0244569 | A1 | 9/2013 | Dunn et al. |
| 2015/0079990 | A1* | 3/2015 | Yun ................... H04W 36/0083 455/436 |
| 2016/0037407 | A1* | 2/2016 | Alamshahi ............ H04W 36/08 370/331 |

FOREIGN PATENT DOCUMENTS

EP    2453692 A1    5/2012

* cited by examiner

*Primary Examiner* — Omoniyi Obayanju
(74) *Attorney, Agent, or Firm* — Arent Fox LLP

(57) ABSTRACT

The present disclosure presents a method and an apparatus for determining a target cell that is under cell identifier confusion during handovers at a small cell. For example, the disclosure presents a method that includes detecting that a target cell confusion exists at a source small cell for a target physical cell identity (PCI) during a handover of a user equipment (UE) from the source small cell to a target small cell, comparing PCI information reported by the UE during the handover with PCI information of neighbors of each of the plurality of neighboring small cells with the same PCI value, determining whether the target small cell has been identified based at least on the PCI comparison, and performing the handover of the UE from the source small cell to the target small cell. As such, a target cell may be determined.

17 Claims, 8 Drawing Sheets

DETERMINING A TARGET CELL UNDER CELL IDENTIFIER CONFUSION DURING HANDOVERS AT A BASE STATION

BACKGROUND

Aspects of the present disclosure relate generally to wireless communication systems, and more particularly, to handovers under cell identifier confusion, e.g., physical cell identity (PCI) confusion.

Wireless communication networks are widely deployed to provide various communication services such as telephony, video, data, messaging, broadcasts, and so on. A PCI identifies a cell within a network. Due to the limited number of PCIs that are allowed, two different types of PCI conflicts are possible with PCI assignments, e.g., PCI collision and PCI confusion. PCI collision occurs when neighboring cells are assigned the same PCI. PCI confusion occurs when two neighbors of a cell are assigned the same PCI. When a base station (e.g., a small cell) has to identify a target cell during handover of a UE to another base station, it may use PCIs to help identify the target cell. However, when two or more neighboring cells have the same PCI, PCI confusion exists. Therefore, there is a desire for correctly determining the target cell that is under PCI confusion during handovers at a base station.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for determining a target cell which is under physical cell identity (PCI) confusion during handovers at a small cell. For example, the present disclosure presents an example method that may include detecting that a target cell confusion exists at a source small cell for a target PCI during a handover of a user equipment (UE) from the source small cell to a target small cell, wherein the target small cell is one of a plurality of neighboring small cells with a same PCI value, comparing PCI information reported by the UE during the handover with PCI information of neighbors of each of the plurality of neighboring small cells with the same PCI value, determining whether the target small cell has been identified based at least on the PCI comparison, and performing the handover of the UE from the source small cell to the target small cell in response to determining that the target small cell has been identified. In an additional aspect, the present disclosure presents an example method that may include comparing reference signal (RS) energy measurements received from the UE with reference energy patterns (REPs) of the plurality of neighboring small cells with the same PCI value in response to determining that the target small cell has not been identified based at least on the PCI comparison, determining the target small cell based at least on the comparing of the RS energy measurements with the REPs, and performing the handover of the UE from the source small cell to the determined target small cell.

In a further aspect, the present disclosure presents an example non-transitory computer readable medium storing computer executable code for determining a target cell that is under physical cell identity (PCI) confusion during handovers at a small cell that may include code for detecting that target cell confusion exists at a source small cell for a target PCI during a handover of a user equipment (UE) from the source small cell to a target small cell, wherein the target small cell is one of a plurality of neighboring small cells with a same PCI value, code for comparing PCI information reported by the UE during the handover with PCI information of neighbors of each of the plurality of neighboring small cells with the same PCI value, code for determining whether the target small cell has been identified based at least on the PCI comparison, and code for performing the handover of the UE from the source small cell to the target small cell in response to determining that the target small has been identified.

Furthermore, in an aspect, the present disclosure presents an example apparatus for determining a target cell which is under physical cell identity (PCI) confusion during handovers at a small cell that may include a PCI confusion detecting component to detect that a target cell confusion exists at a source small cell for a target PCI during a handover of a user equipment (UE) from the source small cell to a target small cell, wherein the target small cell is one of a plurality of neighboring small cells with the same PCI value, a PCI information comparing component to compare PCI information reported by the UE during the handover with PCI information of neighbors of each of the plurality of neighboring small cells with the same PCI value, a target cell determining component to determine whether the target small cell has been identified based at least on the PCI comparison, and a handover performing component to perform the handover of the UE from the source small cell to the target small cell in response to determining that the target small cell has been identified.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
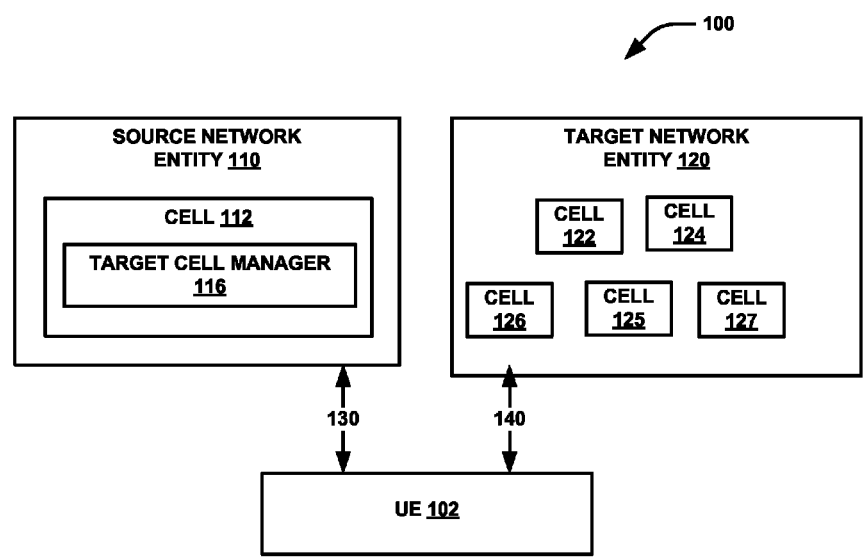
FIG. 1 is a block diagram illustrating an example wireless system in aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Automatic physical cell identity (PCI) configuration is one of the key features of self organizing networks as defined in 3GPP Specifications. A PCI assignment is confusion free if there is no cell in the network that has two or more neighboring cells with identical PCIs. However, as the total number of PCIs is limited to a total of 504, network operators generally determine how PCIs are assigned in the network. For instance, an operator may choose to allocate a portion of PCIs to a small cell network, e.g., an operator may partition the PCIs between a macro network and a small cell network to avoid PCI conflicts. In some cases, Neighbor Relation Tables (NRTs), which are based on PCIs, may be used for handover management by the network operator.

Due to the limited number of PCIs that are allowed, however, the operator may need to reuse at least some of the PCIs. This may lead to an unavoidable scenario to operate the network under PCI conflicts (e.g., PCI confusion and PCI collision). PCI confusion occurs when two neighbors of a cell are assigned the same PCI. PCI collision occurs when neighboring cells are assigned same PCI. The physical (PHY) layer is not designed to deal with this scenario resulting in significant channel estimation loss and therefore small cells (SCs) need to be configured in a collision-free way. Additionally, problems associated with PCI conflicts not only depend on the number of PCIs allocated but also on the network topology, especially in case of dense deployments.

The present disclosure provides a method and an apparatus for determining a target cell that is under physical cell identity (PCI) confusion during handovers at a small cell that may include detecting that a target cell confusion exists at a source small cell for a target PCI during a handover of a user equipment (UE) from the source small cell to a target small cell, wherein the target small cell is one of a plurality of neighboring small cells with a same PCI value, comparing PCI information reported by the UE during the handover with PCI information of neighbors of each of the plurality of neighboring small cells with the same PCI value, determining whether the target small cell has been identified based at least on the PCI comparison, and performing the handover of the UE from the source small cell to the target small cell in response to determining that the target small cell has been identified.

In an additional aspect, the disclosure may further include comparing reference signal (RS) energy measurements received from the UE with reference energy patterns (REPs) of the plurality of neighboring small cells with the same PCI value in response to determining that the target small cell has not been identified based at least on the PCI comparison, determining the target small cell based at least on the comparing of the RS energy measurements with the REPs, and performing the handover of the UE from the source small cell to the determined target small cell.

Referring to FIG. 1, a wireless communication system 100 is illustrated that facilitates determining a target cell that is under cell identifier confusion (e.g., PCI confusion) during handovers at a small cell. For example, system 100 includes a UE 102 that may communicate with a source network entity 110 and/or a target network entity 120, via one or more over-the-air links 130 and/or 140. For example, in an aspect, source network entity 110 may include a cell 112 and/or target network entity 120 may include cells 122, 124, 125, 126, and/or 127. In an aspect, cell 112 may include a target cell manager 116 for determining a target cell under PCI confusion during a handover at cell 112. For UMTS cells, PCI equivalent is primary scrambling code (PSC) and for CDMA/EV-DO cells, PCI equivalent is pseudo random noise (PN) offset.

In an aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

PCI confusion typically occurs in dense small deployments when a cell (e.g., a small cell, a base station, etc.) has neighbors (e.g., target cells) with the same PCI value but different e-UTRAN cell global identifier (eCGI) values. A PCI distinguishes a cell from its neighbors, typically immediate neighbors, and is a number from 0 to 503. In contrast, an eCGI identifies a cell anywhere (e.g., globally) and is a combination of public land mobile network identifier (PLMN Id) and cell identity.

For instance, in an aspect, cell 112 may be configured with a PCI value of "A" with cells 122 and 124 of target network entity 120 as neighbors. Cells 122 and 124 may be configured with the same PCI value, "W," but cells 122 and 124 may not have any overlapping coverage with one another. In addition, cells 122 and 124 may be configured with different eCGI values, e.g., cell 122 may be configured with an eCGI value of 1 and cell 124 may be configured with an eCGI value of 2. In an additional aspect, cell 112 may be a source cell (e.g., current serving cell of UE 102) and configured with an eCGI value of 0.

In a further additional aspect, cell 125 may a neighboring cell of cell 112 with overlap in coverage with cells 122 and 124 and configured with a PCI value of "X" and an eCGI value of 3. Cell 126 may a neighboring cell of cell 122 and configured with a PCI value of "Y" and an eCGI value of 4. Cell 127 may be a neighboring cell of cell 112 with overlap in coverage with cells 112 and 124 (but not with cell 122) and configured with a PCI value of "Z" and eCGI value of 5.

In an aspect, when cell 112, which may be configured with target cell manager 116, initiates a handover of UE 102 from cell 112 to a cell with PCI value of "W", cell 112 may detect two cells (e.g., cells 122 and 124) with the same PCI value (e.g., PCI value of W) in its NRT. As a result, cell 112 may not be able to determine the correct target cell for performing the handover of UE 102 unless the target cell is correctly determined in a timely manner.

In an aspect, cell 112 and/or target cell manager 116 may be configured to determine a target cell under PCI confusion during handovers at a small cell by detecting that a target cell confusion exists at a source small cell for a target PCI during a handover of a user equipment (UE) from the source small cell to a target small cell, wherein the target small cell is one of a plurality of neighboring small cells with a same PCI value, comparing PCI information reported by the UE during the handover with PCI information of neighbors of each of a plurality of neighboring small cells of the source small cell with the same PCI value, determining the target small cell based at least on the PCI comparison, and performing the handover of the UE from the source small cell to the determined target cell.

In an additional or optional aspect, cell 112 and/or target cell manager 116 may be configured to determine a target cell under PCI confusion by comparing reference signal (RS) energy measurements received from the UE with reference energy patterns (REP) of the plurality of neighboring small cells with the same PCI value, determining the target cell based at least on the comparing of the RS energy measurements and the REPs, and performing the handover of the UE from the source small cell to the determined target cell.

Figure 2:
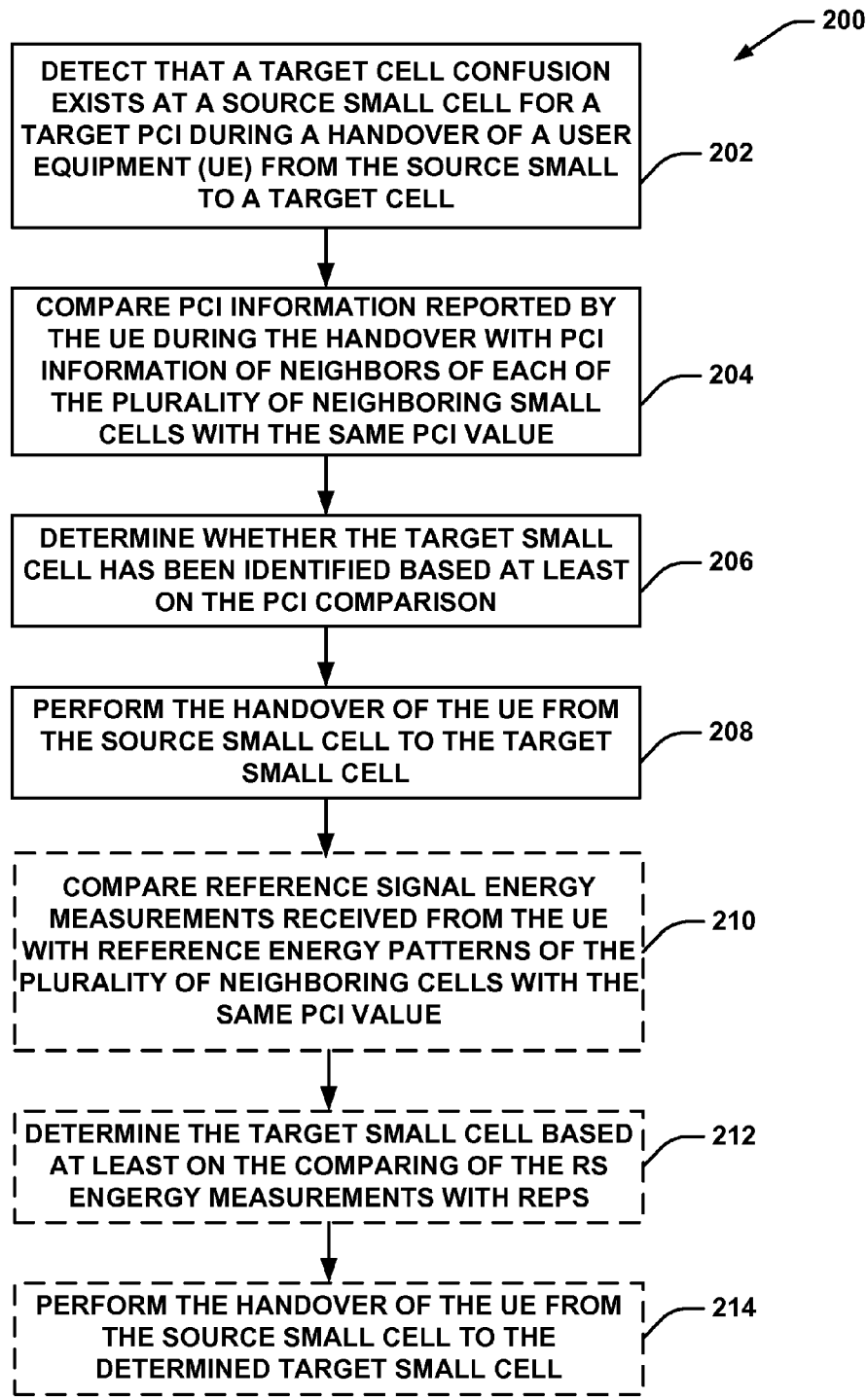
FIG. 2 is a flow diagram illustrating aspects of an example method in aspects of the present disclosure.

FIG. 2 illustrates an example methodology 200 for determining a target cell which is under physical cell identity (PCI) confusion during handovers at a small cell (e.g., cell 112).

In an aspect, at block 202, methodology 200 may include detecting that a target cell confusion exists at a source small cell for a target PCI during a handover of a user equipment (UE) from the source small cell to a target cell, wherein the target cell is one of a plurality of neighboring small cells or a macro cell with a same PCI value. For example, in an aspect, cell 112 and/or target cell manager 116 may include a specially programmed processor module, or a processor executing specially programmed code stored in a memory, to detect that a target cell confusion exists at a source small cell (e.g., cell 112) for a target PCI (e.g., target PCI value of W) during a handover of a user equipment (UE) from the source small cell (e.g., cell 112) to a target cell, wherein the target cell is one of a plurality of neighboring small cells with a same PCI value (e.g., cells 122 or 124). In an aspect, UE 102 may be called as a candidate UE, for reference purposes. In an aspect, the target cell may be any type of cell, e.g., a macro cell, a small cell, femtocell, pico cell, etc.

For example, in an aspect, when cell 112, which may be configured with target cell manager 116, initiates a handover of a UE, e.g., UE 102, cell 112 may detect two cells (e.g., cells 122 and 124) as target cells for handover. As described above, cells 122 and 124 have the same PCI value (e.g., PCI W) in the neighbor relations table (NRT) of cell 112. As a result, cell 112 may not be able to correctly determine the cell for performing the handover of UE 102. In an aspect, cell 112 may explicitly request UE 102 to decode eCGI of the target cells (e.g., cells 122 and 124). But this may not be desirable as the handover success of UE 102 from cell 112 depends on the mobility of the UE and/or eCGI decoding of the target cell (122 or 124). The eCGI decoding may take a longer time (e.g., longer than a handover without eCGI decoding) and may negatively affect the handover of UE 102 (e.g., handover failure). In an aspect, target cell manager 116 may include a PCI confusion detecting component 252 to perform this functionality.

In an aspect, at block 204, methodology 200 may include comparing PCI information reported by the UE during the handover with PCI information of neighbors of each of the plurality of neighboring small cells with the same PCI value. For example, in an aspect, cell 112 and/or target cell manager 116 may include a specially programmed processor module, or a processor executing specially programmed code stored in a memory, to compare PCI information reported by the UE during the handover with PCI information of neighbors of each of the plurality of neighboring small cells with the same PCI value (e.g., PCI information of the neighbors of cells 122 and 124). In an additional aspect, PCI information reported by the UE just before the handover may be compared with PCI information of neighbors of each of the plurality of the neighboring cells with the same PCI value.

In an aspect, PCI information of the neighbors of each of the plurality of neighboring cells of the source small cell may be stored in a neighbor relations table (NRT) at the source cell (e.g., cell 112). This information in the NRT may be created, stored, and/or updated over time from X2 messages exchanged between the cells and/or by other means (e.g., via Network Listen). In an additional or optional aspect, the NRT may be a database that is readily available to be accessed by the source small cell (e.g., cell 112) for determining a target cell during handovers at cell 112.

For example, in an aspect, UE 102 that is involved in a handover and moving from source cell 112 toward target cell 124 may report PCI values of A, W, and Z. Additionally, cell 112 and/or target cell manager 116 may retrieve PCI information of neighbors of confused cells from the NRT at cell 112. Thus, cell 112 and/or target cell manager 116 may determine that cells 122 and 124 have the same PCI values and so may retrieve PCI information of the neighbors of cells 122 and 124. Consequently, cell 112 and/or target cell manager 116 may retrieve PCI values of A and Y for cell 122 and PCI values of A and Z for cell 124.

In an aspect, cell 112 and/or target cell manager 116 may compare PCI values reported by the UE during the handover (e.g., PCI values A, W, and Z) with PCI information of the neighbors (e.g., cell 122—A; cell 124—A and Z). In an aspect, target cell manager 116 may include a PCI information comparing component 254 to perform this functionality.

In an aspect, at block 206, methodology 200 may include determining whether the target small cell has been identified based at least on the PCI comparison. For example, in an aspect, cell 112 and/or target cell manager 116 may include a specially programmed processor module, or a processor executing specially programmed code stored in a memory, to determine whether the target small cell has been identified based at least on the PCI comparison. For instance, in an aspect, cell 112 and/or target cell manager 116 may determine that cell 124 is the target cell based on comparison of PCI information (e.g., PCI values) as described above. That is, the target cell is determined as cell 124 based on a PCI value of Z being the common PCI value between the PCI information reported by UE 102 and PCI information of the neighboring cell 124. In an aspect, target cell manager 116 may include a target cell determining component 256 to perform this functionality.

In an aspect, at block 208, methodology 200 may include performing the handover of the UE from the source small cell to the target small cell in response to determining that the target small cell has been identified. For example, in an aspect, cell 112 and/or target cell manager 116 may include a specially programmed processor module, or a processor executing specially programmed code stored in a memory, to perform the handover of UE 102 from cell 112 to cell 124 in response to determining that the target small cell (e.g., cell 124) has been identified. For instance, in an aspect, target cell manager 116 may trigger the handover to cell 124. In an aspect, target cell manager 116 may include a handover performing component 258 to perform this functionality. The handover performing component 258 may perform the handover once the correct target cell is determined as described above.

In an optional aspect, at block 210, methodology 200 may optionally include comparing reference signal (RS) energy measurements received from the UE with reference energy patterns (REPs) of the plurality of neighboring small cells with the same PCI value in response to determining that the target small cell has not been identified based at least on the PCI comparison. As used herein, "reference energy patterns" (REP) of a cell may refer to energy patterns in a cell's neighborhood that may be used as a reference during a UE handover. For example, in an aspect, cell 112 and/or target cell manager 116 may include a specially programmed processor module, or a processor executing specially programmed code stored in a memory, to compare reference signal (RS) energy measurements received from the UE with reference energy patterns (REPs) of the plurality of neighboring small cells with the same PCI value in response to determining that the target small cell has not been identified based at least on the PCI comparison. In an aspect, if there is no identifying information, such as, e.g., cell 127 with PCI value of Z (as described above) that could help to determine the correct target cell, the target small cell may not be determined from the PCI comparison. In an additional example, for instance, when cell 112 has only cells 122 and 124 as neighbors and the same reference cells, cell 112 and/or target cell manager 116 may not be able to determine the target cell based on the PCI comparison as described above. In an aspect, target cell manager 116 may optionally further configure the target cell determining component 256 to perform this functionality (e.g., identify that the target small cell is not determined from the PCI comparison. Additionally, REPs may be developed based on UE measurements associated with a successful handover, explicit eCGI decoding, and/or X2 communications, etc. In an additional aspect, the REPs are updated (e.g., cleared and re-populated or refreshed) regularly (e.g., time to time) to address situations related to small cell movements, transmit power changes, etc.

For instance, in an aspect, in addition to the PCI information stored in the NRT as described above for each cell under confusion (e.g., cells 122 and/or 124), information related to energy patterns in the cells' neighborhoods can be used as a reference during the handover of the UE to the cells. As an example, information related to energy patterns of, cells 122 and/or 124 may be maintained at the source small cell (e.g., cell 112). These energy patterns may be obtained, updated, and stored over a course of time based on suitable measurement reports from UEs.

For example, a suitable UE report may be generally defined as a UE report that is received from a UE that is at the edge of the source small cell (e.g., cell 112). The UE report may also be used to identify eCGI values of a confused cell (e.g., cell 122 and/or 124) so that the UE can associate the UE report with the correct confused cell (e.g., cell 122 or cell 124). UE reports that could be properly associated with an eCGI and further include UE location information and/or time information of the UE measurements (e.g., energy measurements, RSRP, etc.) may be used to create and/or update the NRT at the source small cell. As used herein, such UEs are referred to as "reference UEs." As also used herein, the cells for which the reference UEs report their measurements are referred to as "reference cells". In an aspect, reference cells may be identified by PCI only. These measurements constitute REPs of a confused cell.

In an additional aspect, the latest entry (e.g., the cell corresponding to the entry that is closest to the time of determining the target cell) of the UE reports may be used in determining a target cell. Additionally or alternatively, the cell that is closest to the location of the candidate UE that is included in the UE reports may be used in determining a target cell. In an additional aspect, if available, transmit power information of the neighbor cells may be used to reflect changes in transmit powers of neighbors in energy measurement comparison.

In an aspect, the REPs of confused cells are different and therefore may be used in decision making process for determining a target cell. In an additional aspect, reference UEs and candidate UEs report the reference signal (RS) measurements of the confused cells and the source small cell in their measurement reports.

For example, in an aspect, reference signal (RS) energy measurements received from UE 102 may be compared with reference energy patterns (REPs) of confused cells, e.g., cells 122 and 124. That is, during the handover of UE 102 when the UE is moving from cell 112 toward cell 124, UE 102 may report PCI values of A and W with their energy measurements pattern closer to REP of cell 124 than that of cell 122, e.g., the tuple, RSRP/RSRQ of (W, A) of UE report is closer to the reference tuple (REP), RSRP/RSRQ of (W, A) of cell 124 than that of cell 122.

In an additional aspect, for example, cell 125 may have overlapping coverage with cells 112, 122, and 124. During the handover of UE 102, when the UE is moving from cell 112 toward cell 124, UE 102 may report PCI values of A, W, and X with their RS energy measurements pattern closer to REP of cell 124 than that of cell 122 e.g., the tuple, RSRP/RSRQ of (W, A, X) of UE report is closer to the reference tuple (REP), RSRP/RSRQ of (W, A, X) of cell 124 than that of cell 122. In an additional aspect, non-common cells, e.g., neighbor cell 127 (PCI value of Z) of cell 124 and neighbor cell 126 (PCI value of Y) of cell 122 may be considered as well, as UE minimum sensitivity may be used in comparing energy measurements. For example, when UE reports (W, A, X, Z), the REP of cell 122 has (W, A, X, Y) while cell 124 has (W, A, X, Z). For comparison purposes, UE minimum sensitivity in energy measurement comparison may be used, e.g., UE reported (W, A, X, Y=$UE_{minSensitivity}$, Z) may be compared against cells 122's REP (W, A, X, Y, Z=$UE_{minSensitivity}$) and cell 124's REP (W, A, X, Y=$UE_{minSensitivity}$, Z). In an aspect, target cell manager 116 may optionally include an energy comparing component 260 to perform this functionality.

In an optional aspect, at block 212, methodology 200 may optionally include determining the target cell based at least on the comparing of the RS energy measurements with the REPs. For example, in an aspect, cell 112 and/or target cell manager 116 may include a specially programmed processor module, or a processor executing specially programmed code stored in a memory, to determine the target cell (e.g., cell 124) based at least on the comparing of the RS energy measurements with the REPs. That is, cell 112 and/or target cell manager 116 may determine that cell 124 is the target cell based on the matching of the reported measurements to REPs (e.g., measurements of PCI A,W with REP of cell 124, RSRP/RSRQ of A in UE report is closer to reference RSRP/RSRQ_A_124 and RSRP/RSRQ of W in UE report is closer to reference RSRP/RSRQ_W_124). In an aspect, target cell manager 116 may optionally further configure the target cell determining component 256 to perform this functionality.

In an aspect, at block 214, methodology 200 may optionally include performing the handover of the UE from the source small cell to the determined target small cell. For example, in an aspect, cell 112 and/or target cell manager 116 may include a specially programmed processor module, or a processor executing specially programmed code stored in a memory, to perform the handover of the UE from the source small cell (e.g., cell 112) to the determined target cell (e.g., cell 124). In an aspect, target cell manager 116 may optionally further configure the handover performing component 258 to perform this functionality. In an additional or optional aspect, methodology 200 may optionally include storing the REPs of the plurality of neighboring small cells (e.g., 122, 124, 125, 126, 127, etc.) at the source small cell (e.g., cell 112). In an aspect, target cell manager 116 may optionally include an energy storing component 262 to perform this functionality.

In an additional or optional aspect, cell 112 and/or target cell manager 116 may compare reference signal (RS) energy measurements received from the UE with reference energy patterns (REPs) of the plurality of neighboring small cells with the same PCI value, determine the target cell based at least on the comparing of the RS energy measurements and the REPs, and perform the handover of the UE from the source small cell to the determined target cell, as described above. Further, the procedure described above in reference to FIG. 2 may be used along with explicit eCGI decoding or any other mechanism. Furthermore, in an additional aspect, inter-RAT measurements may also be considered. For example, cell 127 (e.g. operating on UMTS RAT) may have overlapping (or common) coverage with cells 122 and 124. In such a scenario, UE measurement reports may include cell 127 in their reports and/or the stored REPs may include cell 127. For UMTS cells, PCI equivalent is primary scrambling code (PSC) and for CDMA/EV-DO, PCI equivalent is pseudo random noise (PN) offset.

As described above, a target cell that is under physical cell identity (PCI) confusion during handovers at a small cell may be determined.

Figure 3:
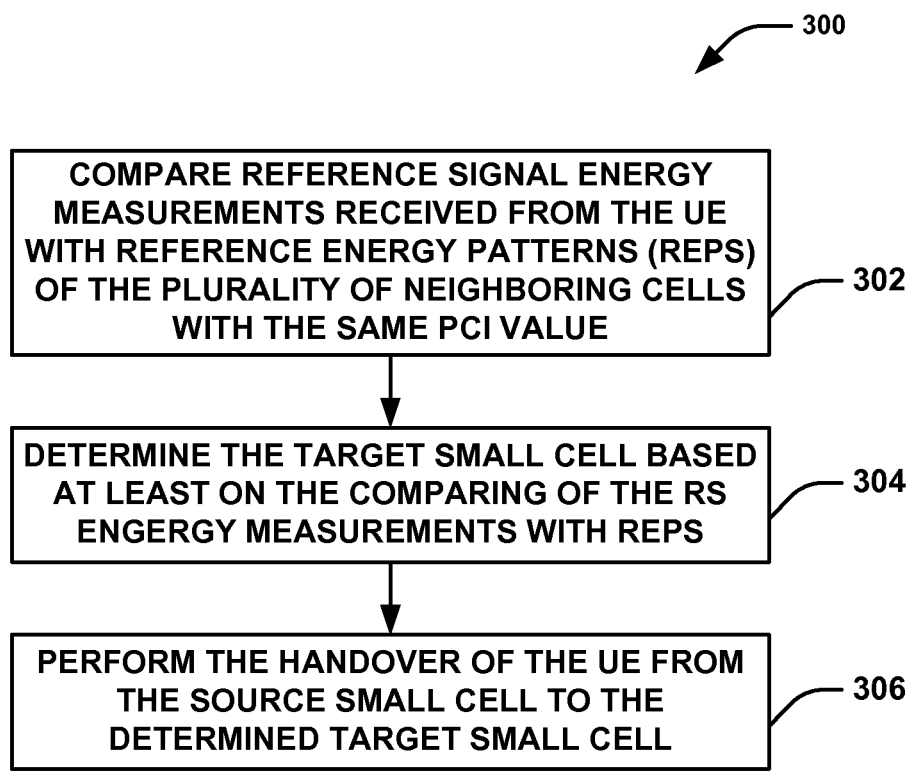
FIG. 3 is a flow diagram illustrating additional aspects of an example method in aspects of the present disclosure.

FIG. 3 illustrates an additional example methodology 300 for determining a target cell which is under physical cell identity (PCI) confusion during handovers at a small cell (e.g., cell 112).

In an aspect, at block 302, methodology 300 may include comparing reference signal (RS) energy measurements received from the UE with reference energy patterns (REPs) of the plurality of neighboring small cells with the same PCI value in response to determining that the target small cell has not been identified based at least on the PCI comparison For example, in an aspect, as described above in relation to block 212 of FIG. 2, cell 112 and/or target cell manager 116 may include a specially programmed processor module, or a processor executing specially programmed code stored in a memory, to compare reference signal (RS) energy measurements received from the UE with reference energy patterns (REPs) of the plurality of neighboring small cells with the same PCI value in response to determining that the target small cell has not been identified based at least on the PCI comparison. In an aspect, target cell manager 116 may include an energy comparing component 260 to perform this functionality.

In an aspect, at block 304, methodology 300 may include determining the target cell based at least on the comparing of the RS energy measurements with the REPs. For example, in an aspect, as described above in relation to block 214 of FIG. 2, cell 112 and/or target cell manager 116 may include a specially programmed processor module, or a processor executing specially programmed code stored in a memory, to determine the target cell (e.g., cell 124) based at least on the comparing of the RS energy measurements with the REPs. In an aspect, target cell manager 116 may further configure the target cell determining component 256 to perform this functionality.

In an aspect, at block 306, methodology 300 may include performing the handover of the UE from the source small cell to the determined target cell. For example, in an aspect, as described above in relation to block 216 of FIG. 2, cell 112 and/or target cell manager 116 may include a specially programmed processor module, or a processor executing specially programmed code stored in a memory, to perform the handover of the UE from the source small cell (e.g., cell 112) to the determined target cell (e.g., cell 124). In an aspect, target cell manager 116 may optionally further configure the handover performing component 258 to perform this functionality. In an additional or optional aspect, methodology 200 may optionally include storing the REPs of the plurality of neighboring small cells (e.g., 122, 124, 125, 126, 127, etc.) at the source small cell (e.g., cell 112). In an aspect, target cell manager 116 may optionally include an energy storing component 262 to perform this functionality.

As described above, a target cell that is under physical cell identity (PCI) confusion during handovers at a small cell may be determined.

Figure 4:
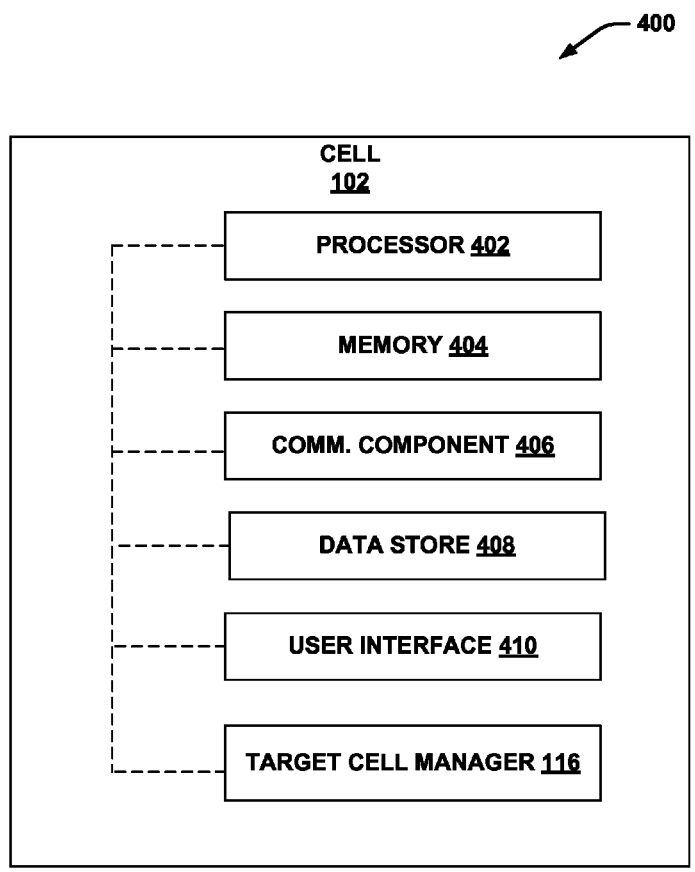
FIG. 4 is a block diagram illustrating aspects of an example cell (or base station) including a target cell manager according to the present disclosure.

Referring to FIG. 4, in an aspect, cell 112, for example, including target cell manager 116 may be or may include a specially programmed or configured computer device. In one aspect of implementation, cell 112 may include target cell manager 116 and its sub-components, including PCI confusion detecting component 252, PCI information comparing component 254, target cell determining component 256, handover performing component 258, energy comparing component 260, and/or energy storing component 262, such as in specially programmed computer readable instructions or code, firmware, hardware, or some combination thereof.

In an aspect, for example as represented by the dashed lines, target cell manager 116 may be implemented or executed using one or any combination of processor 402, memory 404, communications component 406, and data store 408. For example, target cell manager 116 may be defined or otherwise programmed as one or more processor modules of processor 402. Further, for example, target cell manager 116 may be defined as a computer-readable medium stored in memory 404 and/or data store 408 and executed by processor 402. Moreover, for example, inputs and outputs relating to operations of target cell manager 116 may be provided or supported by communications component 406, which may provide a bus between the components of computer device 400 or an interface to communication with external devices or components.

Cell 112 may include a processor 402 specially configured to carry out processing functions associated with one or more of components and functions described herein. Processor 402 can include a single or multiple set of processors or multi-core processors. Moreover, processor 402 can be implemented as an integrated processing system and/or a distributed processing system.

Cell 112 further includes a memory 404, such as for storing data used herein and/or local versions of applications and/or instructions or code being executed by processor 402, such as to perform the respective functions of the respective entities described herein. Memory 404 can include any type of memory usable by a computer, such as random access memory (RAM), read only memory (ROM), tapes, magnetic discs, optical discs, volatile memory, non-volatile memory, and any combination thereof.

Further, cell 112 includes a communications component 406 that provides for establishing and maintaining communications with one or more parties utilizing hardware, software, and services as described herein. Communications component 406 may carry communications between components on cell 112, as well as between user and external devices, such as devices located across a communications network and/or devices serially or locally connected to cell 112. For example, communications component 406 may include one or more buses, and may further include transmit chain components and receive chain components associated with a transmitter and receiver, respectively, or a transceiver, operable for interfacing with external devices.

Additionally, cell 112 may further include a data store 408, which can be any suitable combination of hardware and/or software, that provides for mass storage of information, databases, and programs employed in connection with aspects described herein. For example, data store 408 may be a data repository for applications not currently being executed by processor 402.

Cell 112 may additionally include a user interface component 410 operable to receive inputs from a user of cell 112, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 5:
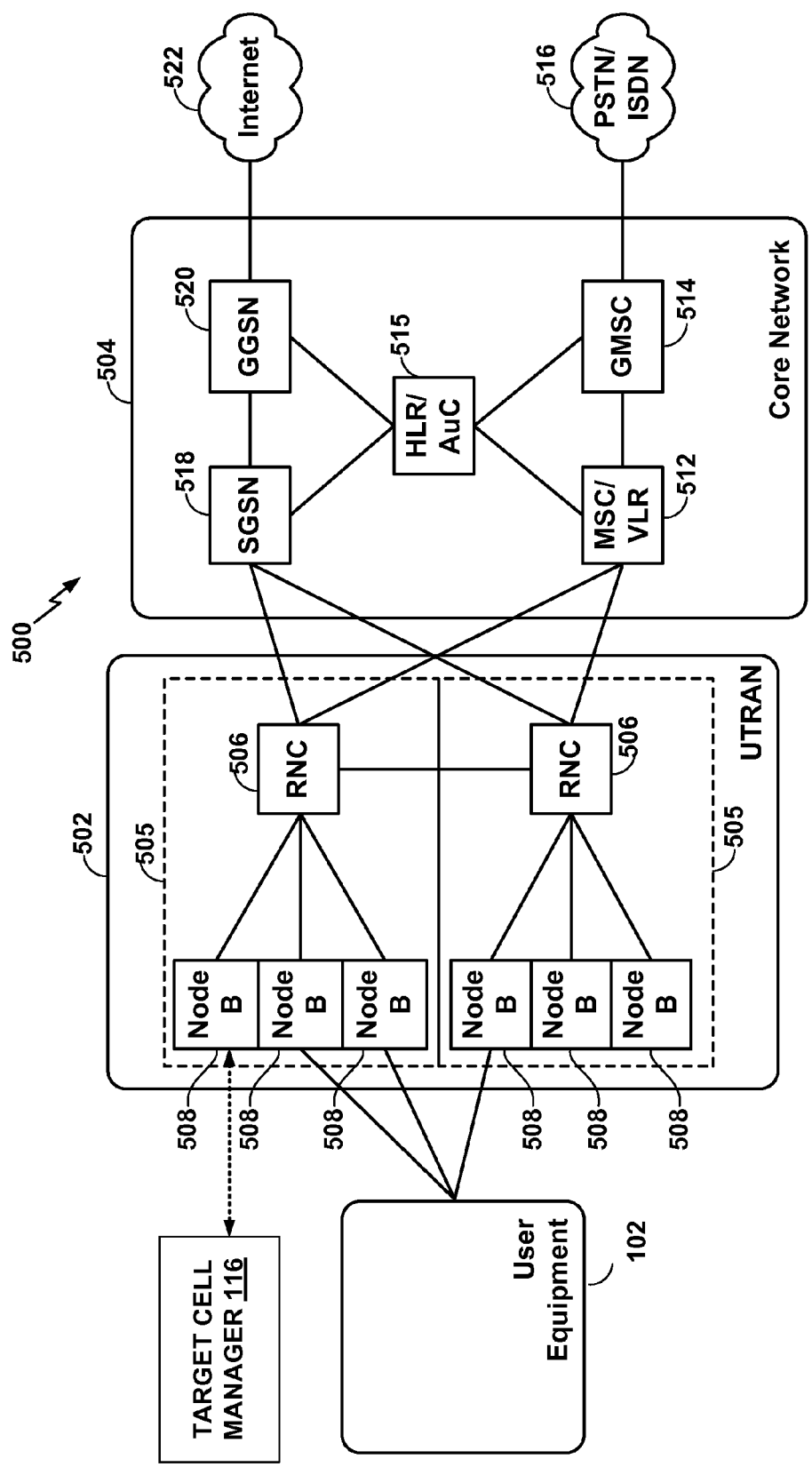
FIG. 5 is a block diagram conceptually illustrating an example of a telecommunications system including a cell (or base station) with a target cell manager according to the present disclosure.

Referring to FIG. 5, by way of example and without limitation, the aspects of the present disclosure are presented with reference to a UMTS system 500 employing a W-CDMA air interface, and may include a cell 112 executing an aspect of target cell manager 116 of FIGS. 1 and 4. A UMTS network includes three interacting domains: a Core Network (CN) 504, a UMTS Terrestrial Radio Access Network (UTRAN) 502, and UE 102. In an aspect, as noted, cell 112 (FIG. 1) may be configured to perform functions thereof, for example, including determining a target cell which is under physical cell identity (PCI) confusion during handovers at cell 112. Further, UTRAN 502 may comprise source network entity 110 and/or target network entity 120 (FIG. 1), which in this case may be respective ones of the Node Bs 508. In this example, UTRAN 502 provides various wireless services including telephony, video, data, messaging, broadcasts, and/or other services. The UTRAN 502 may include a plurality of Radio Network Subsystems (RNSs) such as a RNS 505, each controlled by a respective Radio Network Controller (RNC) such as an RNC 506. Here, the UTRAN 502 may include any number of RNCs 506 and RNSs 505 in addition to the RNCs 506 and RNSs 505 illustrated herein. The RNC 506 is an apparatus responsible for, among other things, assigning, reconfiguring, and releasing radio resources within the RNS 505. The RNC 506 may be interconnected to other RNCs (not shown) in the UTRAN 502 through various types of interfaces such as a direct physical connection, a virtual network, or the like, using any suitable transport network.

Communication between cell 112 (Node B 508) and UE 102 may be considered as including a physical (PHY) layer and a medium access control (MAC) layer. Further, communication between UE 102 and RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 44.331 v4.1.0, incorporated herein by reference.

The geographic region covered by the RNS 505 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 505; however, the RNSs 505 may include any number of wireless Node Bs. The Node Bs 508 provide wireless access points to a CN 504 for any number of mobile apparatuses, such as UE 102, and may be source network entity 110 and/or target network entity 120 of FIG. 1.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For illustrative purposes, one UE 102 is shown in communication with a number of the Node Bs 508. The DL, also called the forward link, refers to the communication link from a NodeB 508 to a UE 102, and the UL, also called the reverse link, refers to the communication link from a UE 102 to a NodeB 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 102 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 508 and a UE 102. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 102 provides feedback to Node B 508 over the HS-DPCCH to indicate whether it correctly decoded a packet on the downlink.

HS-DPCCH further includes feedback signaling from the UE 102 to assist the Node B 508 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 508 and/or the UE 102 may have multiple antennas supporting MIMO technology. The use of MIMO technology enables the Node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 102 to increase the data rate or to multiple UEs 102 to increase the overall system capacity. This is achieved by spatially precoding each data stream and then transmitting each spatially precoded stream through a different transmit antenna on the downlink. The spatially precoded data streams arrive at the UE(s) 102 with different spatial signatures, which enables each of the UE(s) 102 to recover the one or more the data streams destined for that UE 102. On the uplink, each UE 102 may transmit one or more spatially precoded data streams, which enables Node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
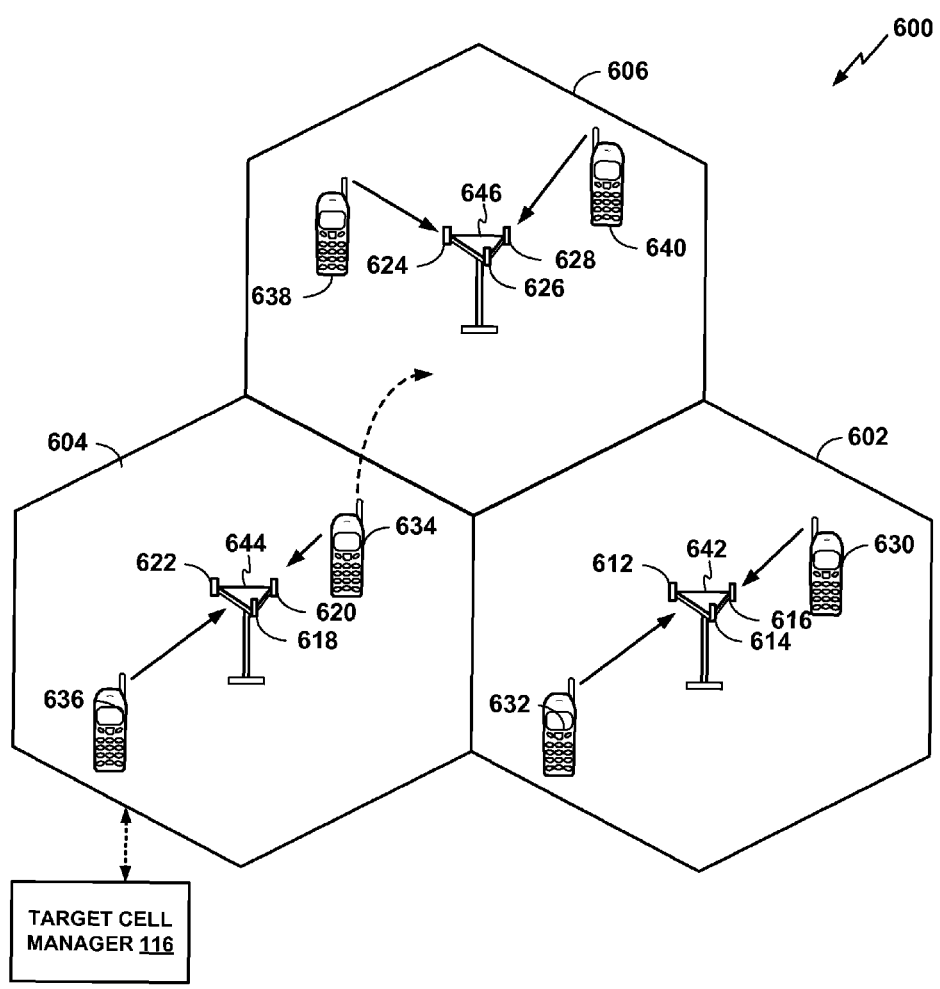
FIG. 6 is a conceptual diagram illustrating an example of an access network including a cell (or base station) with a target cell manager according to the present disclosure.

Referring to FIG. 6, an access network 600 in a UTRAN architecture is illustrated, and may include one or more cells 602, 604, and 606, which may be the same as or similar to cell 112 (FIG. 1) in that they are configured to include target cell manager 116 (FIG. 1; for example, illustrated here as being associated with cell 604) for determining a target cell which is under PCI or PSC confusion during handovers at small cell 112. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. UEs, for example, 630, 632, etc. may include several wireless communication devices, e.g., User Equipment or UEs, which may be in communication with one or more sectors of each cell 602, 604 or 606. For example, UEs 630 and 632 may be in communication with NodeB 642, UEs 634 and 636 may be in communication with NodeB 644, and UEs 638 and 640 can be in communication with NodeB 646. Here, each NodeB 642, 644, 646 is configured to provide an access point to a CN 404 (FIG. 4) for all the UEs 630, 632, 634, 636, 638, 640 in the respective cells 602, 604, and 606. Additionally, each NodeB 642, 644, 646 may be cell 112 of FIG. 1 and may perform the methods outlined herein. Access network 600 may further include one or more UEs 630, 632, 634, 636, 638, 640, which may be the same as or similar to UE 102 (FIG. 1).

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 406 (FIG. 4), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

Further, the modulation and multiple access scheme employed by the access network 500 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 1002.11 (Wi-Fi), IEEE 1002.16 (WiMAX), IEEE 1002.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
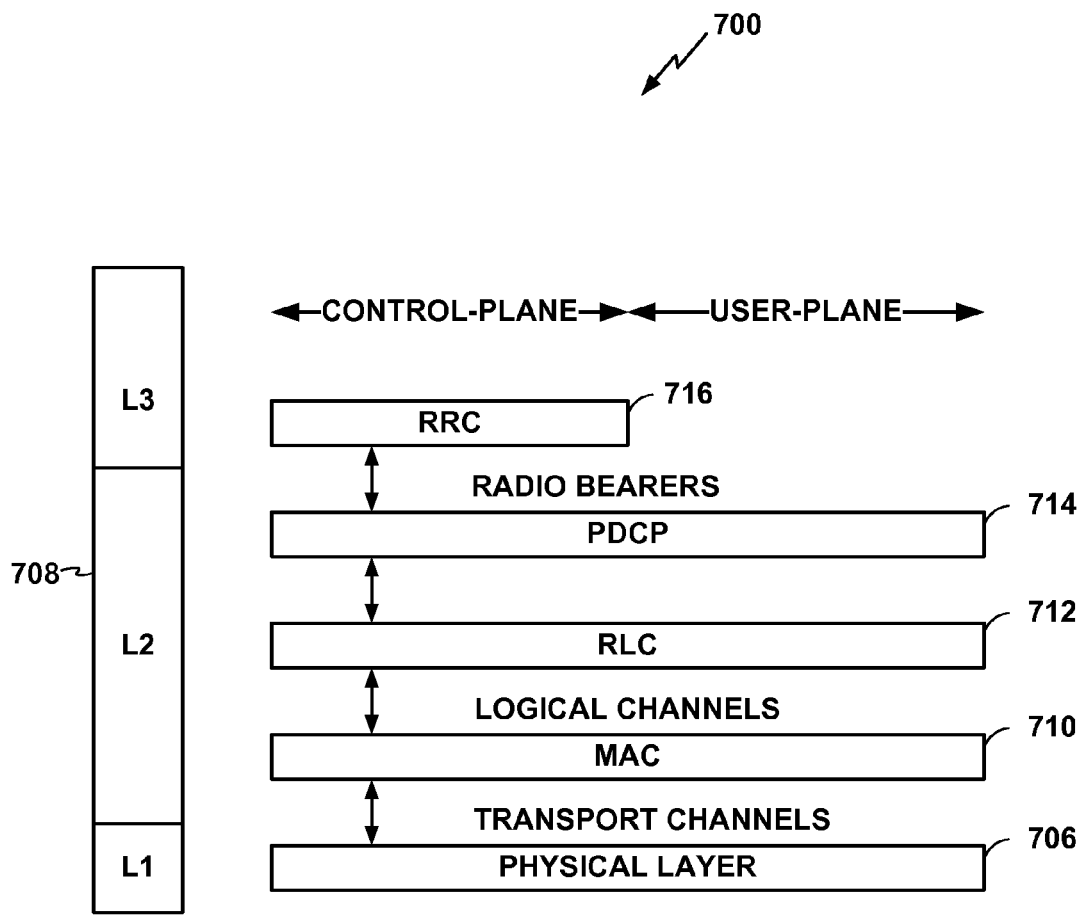
FIG. 7 is a conceptual diagram illustrating an example of a radio protocol architecture for the user and control plane that may be used by the cell (or base station) of the present disclosure.

The radio protocol architecture may take on various forms depending on the particular application. An example for an HSPA system will now be presented with reference to FIG. 7. FIG. 7 is a conceptual diagram illustrating an example of the radio protocol architecture for the user and control planes.

Turning to FIG. 7, the radio protocol architecture for the cell, for example, cell 112 of FIG. 1 configured to include target cell manager (FIG. 1) for determining a target cell which is under physical cell identity (PCI) confusion during handovers at a small cell is shown with three layers: Layer 1, Layer 2, and Layer 3. Layer 1 is the lowest lower and implements various physical layer signal processing functions. Layer 1 will be referred to herein as the physical layer 706. Layer 2 (L2 layer) 708 is above the physical layer 706 and is responsible for the link between the UE and node B over the physical layer 706.

In the user plane, L2 layer 708 includes a media access control (MAC) sublayer 710, a radio link control (RLC) sublayer 712, and a packet data convergence protocol (PDCP) 714 sublayer, which are terminated at the node B on the network side. Although not shown, the UE may have several upper layers above L2 layer 708 including a network layer (e.g., IP layer) that is terminated at a PDN gateway on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between NodeBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
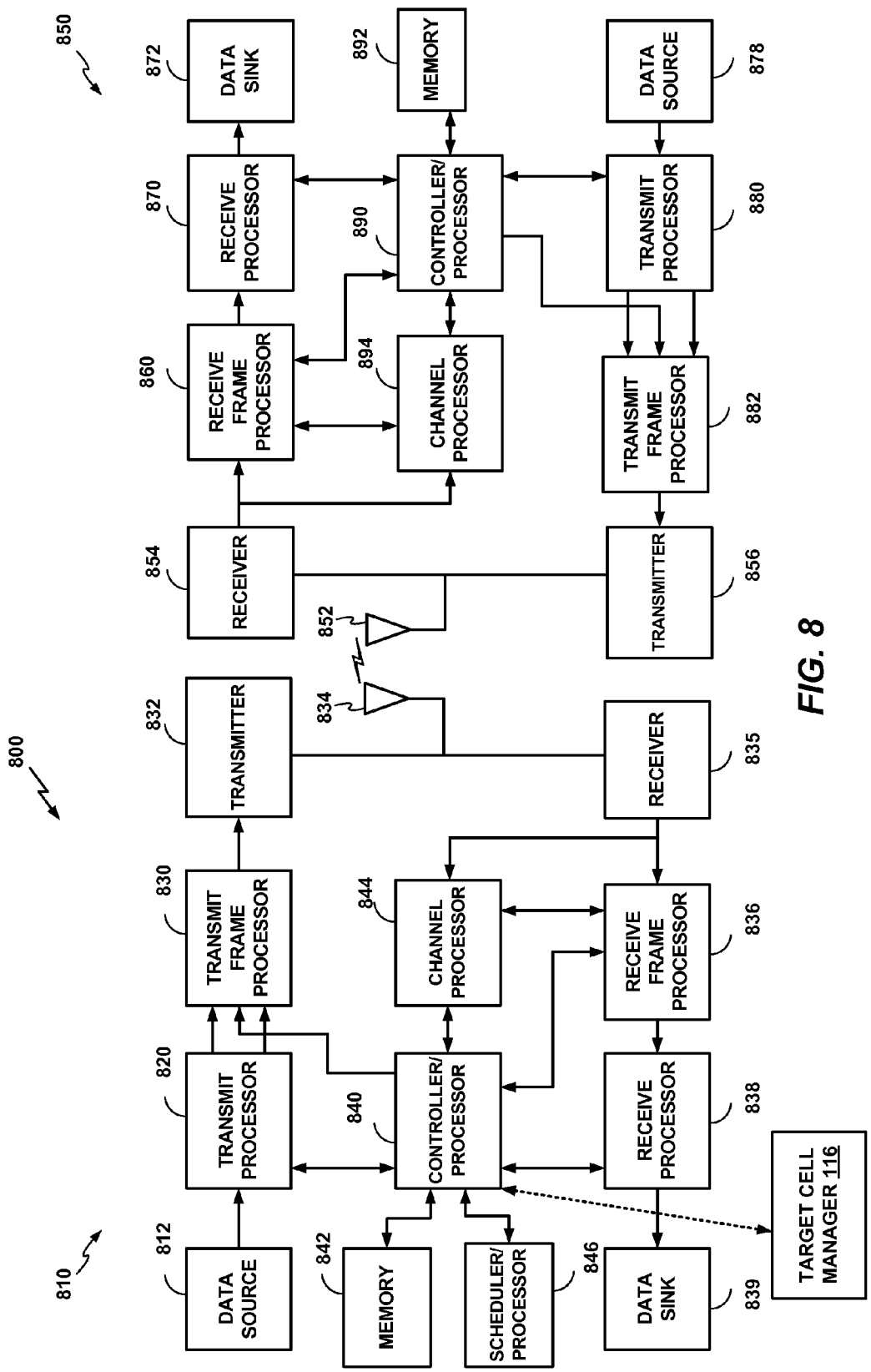
FIG. 8 is a block diagram conceptually illustrating an example of a NodeB, which includes a target cell manager according to the present disclosure, in communication with a UE in a telecommunications system.

FIG. 8 is a block diagram of a NodeB 810 in communication with a UE 850, where the NodeB 810 may be cell 112 of source network entity 110 that it is configured to include target cell manager 116 and/or cell 122, 124, 125, 126, and/or 128 of target network entity 120, and/or NodeB 810 may be the same as or similar to cell 112 of FIG. 1, for determining a target cell which is under physical cell identity (PCI) confusion during handovers at a small cell, in controller/processor 840 and/or memory 842. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the NodeB 810. More specifically, the receive processor 870 descrambles and de-spreads the symbols, and then determines the most likely signal constellation points transmitted by the NodeB 810 based on the modulation scheme. These soft decisions may be based on channel estimates computed by the channel processor 894. The soft decisions are then decoded and de-interleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 870. The data source 878 may represent applications running in the UE 850 and various user interfaces (e.g., keyboard). Similar to the functionality described in connection with the downlink transmission by the NodeB 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the NodeB 810 or from feedback contained in the midamble transmitted by the NodeB 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the NodeB 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct operations at the NodeB 810 and the UE 850, respectively. For example, the controller/processors 840 and 890 may provide various functions including timing, peripheral interfaces, voltage regulation, power management, and other control functions. The computer readable media of memories 842 and 892 may store data and software for the NodeB 810 and the UE 850, respectively. A scheduler/processor 846 at the NodeB 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for determining a target cell that is under physical cell identity (PCI) confusion during handovers at a small cell, comprising:
    detecting, at a source small cell, that a target cell confusion exists at the source small cell for a target PCI during a handover of a user equipment (UE) from the source small cell to a target small cell, wherein the target small cell is one of a plurality of neighboring small cells with a same PCI value;
    comparing, at the source small cell, PCI information reported by the UE during the handover with PCI information of neighbors of each of the plurality of neighboring small cells with the same PCI value, wherein the PCI information of neighbors of each of the plurality of neighboring small cells with the same PCI value is stored at the source small cell;
    determining, at the source small cell, whether the target small cell has been identified based at least on the PCI comparison; and
    in response to determining that the target small cell has not been identified;
        storing reference energy patterns (REPs) of the plurality of neighboring small cells at the source small cell;
        comparing reference signal (RS) energy measurements received from the UE with the REPs of the plurality of neighboring small cells with the same PCI value giving preference to a closest REP;
        determining the target small cell based at least on the comparing of the RS energy measurements with the REPs; and
        performing the handover of the UE from the source small cell to the determined target small cell.

2. The method of claim 1, wherein the RS energy measurements and REPs include RS received power (RSRP) and RS received quality (RSRQ) measurements of the source small cell, the plurality of neighboring small cells, and neighbors of the plurality of neighboring small cells.

3. The method of claim 1, further comprising:
    wherein storing the REPs of the plurality of neighboring small cells at the source small cell comprises storing the REPs of the plurality of neighboring small cells with a location and a timestamp at the source small cell; and
    wherein comparing the RS energy measurements received from the UE with the stored REPs of the plurality of neighboring small cells with the same PCI value giving preference to a closest REP comprises comparing the RS energy measurements received from the UE with the stored REPs of the plurality of neighboring small cells with the target PCI value giving preference to a most recent and a closest REP that is stored at the source small cell.

4. The method of claim 1, wherein the PCI information and the REPs of each of the plurality of neighboring small cells are stored in a neighbor relation table (NRT) at the source small cells.

5. The method of claim 1, further comprising:
receiving and storing the PCI information of neighbors of each of the plurality of neighboring small cells with the same PCI value at the source small cell.

6. The method of claim 1, wherein a neighbor of each of the plurality of neighboring small cells is a small cell.

7. The method of claim 1, further comprising performing the handover of the UE from the source small cell to the target small cell in response to determining that the target small cell has been identified.

8. A non-transitory computer readable medium storing computer executable code for determining a target cell that is under physical cell identity (PCI) confusion during handovers at a small cell, comprising:
  code for detecting, at the source small cell, that target cell confusion exists at a source small cell for a target PCI during a handover of a user equipment (UE) from the source small cell to a target small cell, wherein the target small cell is one of a plurality of neighboring small cells with a same PCI value;
  code for comparing, at the source small cell, PCI information reported by the UE during the handover with PCI information of neighbors of each of the plurality of neighboring small cells with the same PCI value, wherein the PCI information of neighbors of each of the plurality of neighboring small cells with the same PCI value is stored at the source small cell;
  code for determining, at the source small cell, whether the target small cell has been identified based at least on the PCI comparison; and
  code for performing operations in response to determining that the target small cell has not been identified, comprising:
    code for storing reference energy patterns (REPs) of the plurality of neighboring small cells at the source small cell;
    code for comparing reference signal (RS) energy measurements received from the UE with the REPs of the plurality of neighboring small cells with the same PCI value giving preference to a closest REP;
    code for determining the target small cell based at least on the comparing of the RS energy measurements with the REPs; and
    code for performing the handover of the UE from the source small cell to the determined target small cell.

9. The computer readable medium of claim 8, wherein the RS energy measurements and REPs include RS received power (RSRP) and RS received quality (RSRQ) measurements of the source small cell, the plurality of neighboring small cells, and neighbors of the plurality of neighboring small cells.

10. The computer readable medium of claim 8, further comprising:
  wherein code for storing the REPs of the plurality of neighboring small cells at the source small cell comprises code for storing the REPs of the plurality of neighboring small cells with a location and a timestamp at the source small cell; and
  wherein code for comparing the RS energy measurements received from the UE with the stored REPs of the plurality of neighboring small cells with the same PCI value giving preference to a closest REP that is stored at the source small cell comprises code for comparing the RS energy measurements received from the UE with the stored REPs of the plurality of neighboring small cells with the same PCI value giving preference to a most recent and a closest REP that is stored at the source small cell.

11. The computer readable medium of claim 8, wherein the PCI information of neighbors and REPs of each of the neighboring small cells are stored in a neighbor relation table (NRT) at the source small cells.

12. The computer readable medium of claim 8, further comprising code for performing the handover of the UE from the source small cell to the target small cell in response to determining that the target small cell has been identified.

13. An apparatus for determining a target cell that is under physical cell identity (PCI) confusion during handovers at a small cell, comprising:
  a memory; and
  at least one processor coupled to the memory and configured to:
    detect, at the source small cell, that a target cell confusion exists at a source small cell for a target PCI during a handover of a user equipment (UE) from the source small cell to a target small cell, wherein the target small cell is one of a plurality of neighboring small cells with the same PCI value;
    compare, at the source small cell, PCI information reported by the UE during the handover with PCI information of neighbors of each of the plurality of neighboring small cells with the same PCI value, wherein the PCI information of neighbors of each of the plurality of neighboring small cells with the same PCI value is stored at the source small cell;
    determine, at the source small cell, whether the target small cell has been identified based at least on the PCI comparison; and
    in response to determining that the target small cell has not been identified;
      store reference energy patterns (REPs) of the plurality of neighboring small cells at the source small cell;
      compare reference signal (RS) energy measurements received from the UE with the REPs of the plurality of neighboring small cells with the same PCI value giving preference to a closest REP;
      determine the target small cell based at least on the comparing of the RS energy measurements with the REPs; and
      perform the handover of the UE from the source small cell to the determined target small cell.

14. The apparatus of claim 13, wherein the RS energy measurements and REPs include RS received power (RSRP) and RS received quality (RSRQ) measurements of the source small cell, the plurality of neighboring small cells and neighbors of the plurality of neighboring small cells.

15. The apparatus of claim 13, wherein the at least one processor is further configured to:
  store the REPs of the plurality of neighboring small cells at the source small cell comprises by storing the REPs of the neighboring small cells with a location and a timestamp at the source small cell; and
  compare the RS energy measurements received from the UE with the stored REPs of the plurality of neighboring small cells with the same PCI value giving preference to a closest REP by comparing the RS energy measurements received from the UE with the stored REPs of the plurality of neighboring small cells with the same PCI value giving preference to a most recent and a closest REP that is stored at the source small cell.

16. The apparatus of claim 13, wherein the PCI information and REPs of each of the plurality of neighboring small cells are stored in a neighbor relation table (NRT) at the source small cells.

17. The apparatus of claim 13, wherein the at least one processor is further configured to perform the handover of the UE from the source small cell to the target small cell in response to determining that the target small cell has been identified.

* * * * *